United States Patent

Gunning et al.

[15] 3,654,603

[45] Apr. 4, 1972

[54] COMMUNICATIONS EXCHANGE

[72] Inventors: William F. Gunning, Fullerton; John F. Wilson, Santa Ana; Charles C. Bertram, Anaheim, all of Calif.

[73] Assignee: Astrodata, Inc., Anaheim, Calif.

[22] Filed: Oct. 31, 1969

[21] Appl. No.: 873,015

[52] U.S. Cl. .........................340/146.1, 235/153, 340/172.5

[51] Int. Cl. .........................H04l 1/00

[58] Field of Search .........................340/146.1, 172.5; 235/153; 179/15 AT, 16 R, 18; 178/50

[56] References Cited

UNITED STATES PATENTS

| | | | |
|---|---|---|---|
| 3,252,149 | 5/1966 | Weida et al. | 340/172.5 |
| 3,302,182 | 1/1967 | Lynch | 340/172.5 |
| 3,377,623 | 4/1968 | Reut et al. | 340/172.5 |
| 3,444,528 | 5/1969 | Lovell et al. | 340/146.1 X |
| 3,445,811 | 5/1969 | Hashimoto et al. | 340/146.1 |
| 3,471,686 | 10/1969 | Connell | 235/153 |
| 3,476,922 | 11/1969 | Yiotis | 235/153 |
| 3,517,174 | 6/1970 | Ossfeldt | 235/153 |

OTHER PUBLICATIONS

S. K. Chao, " The System Organization of MOBIDIC B," 1959 Proceedings of the Eastern Joint Computer Conference, pp. 101- 107.

Brown, Tierney, and Wasserman, " Improvement of Electronic-Computer Reliability through the Use of Redundancy," IRE Transactions on Electronic Computers, September 1961, pp. 407- 416.

*Primary Examiner*—Charles E. Atkinson

*Attorney*—Howard A. Silber and Flam and Flam

[57] ABSTRACT

A communications exchange for automatically interconnecting subscriber lines and trunks employs a switching network operable to establish a large number of possible message transmission paths between subscriber terminators and trunk terminators; multiple computers are operable simultaneously upon network transmitted message processing data to similarly process the data and produce output signals; and communication of data between the switching network and computers is established through a system controller operable to determine which computers shall be preferred as communicating valid data and which of the preferred computers shall be used as a sole survivor to transmit valid processing data to the network.

4 Claims, 12 Drawing Figures

INVENTORS.
WILLIAM F. GUNNING
JOHN F. WILSON
CHARLES C. BERTRAM
By White & Haefliger
ATTORNEYS.

INVENTORS.
WILLIAM F. GUNNING
JOHN F. WILSON
CHARLES C. BERTRAM
By White & Haefliger
ATTORNEYS.

INVENTORS.
WILLIAM F. GUNNING
JOHN F. WILSON
CHARLES C. BERTRAM
By White & Haefliger
ATTORNEYS.

INVENTORS.
WILLIAM F. GUNNING
JOHN F. WILSON
CHARLES C. BERTRAM
By White & Haefliger
ATTORNEYS.

INVENTORS.
WILLIAM F. GUNNING
JOHN F. WILSON
CHARLES C. BERTRAM
By White & Haefliger
ATTORNEYS.

| CTE SYSTEM TELEX CHARACTER CODES | | | | | | | |
|---|---|---|---|---|---|---|---|
| TELEX CHARACTER | | TELEX CODE | RIGHT JUSTIFIED OCTAL 5-BITS | HEXADECIMAL | | RCA 501 | |
| LETTER | FIGURE | SPACE = 0 MARK = 1 | | RIGHT JUSTIFIED | LEFT JUSTIFIED | LETTER | FIGURE |
| A | - | 1 1 0 0 0 | 30 | 18 | C0 | 40 | 14 |
| B | ? | 1 0 0 1 1 | 23 | 13 | 91 | 41 | - |
| C | : | 0 1 1 1 0 | 16 | 0E | 70 | 42 | 06 |
| D | ⊠ (WPU) | 1 0 0 1 0 | 22 | 12 | 90 | 43 | - |
| E | 3 | 1 0 0 0 0 | 20 | 10 | 80 | 44 | 26 |
| F | ▭ | 1 0 1 1 0 | 26 | 16 | B0 | 45 | 07 |
| G | ⊟ | 0 1 0 1 1 | 13 | 0B | 51 | 46 | 12 |
| H | ⧄ | 0 0 1 0 1 | 05 | 05 | 21 | 47 | 36 |
| I | 8 | 0 1 1 0 0 | 14 | 0C | 60 | 50 | 33 |
| J | BELL | 1 1 0 1 0 | 32 | 1A | D0 | 51 | - |
| K | ( | 1 1 1 1 0 | 36 | 1E | F0 | 52 | 03 |
| L | ) | 0 1 0 0 1 | 11 | 09 | 21 | 53 | 04 |
| M | . | 0 0 1 1 1 | 07 | 07 | 31 | 54 | 16 |
| N | , | 0 0 1 1 0 | 06 | 06 | 30 | 55 | 35 |
| O | 9 | 0 0 0 1 1 | 03 | 03 | 11 | 56 | 34 |
| P | 0 | 0 1 1 0 1 | 15 | 0D | 61 | 57 | 23 |
| Q | 1 | 1 1 1 0 1 | 35 | 1D | E1 | 60 | 24 |
| R | 4 | 0 1 0 1 0 | 12 | 0A | 50 | 61 | 27 |
| S | ' | 1 0 1 0 0 | 24 | 14 | A0 | 62 | 13 |
| T | 5 | 0 0 0 0 1 | 01 | 01 | 01 | 63 | 30 |
| U | 7 | 1 1 1 0 0 | 34 | 16 | E0 | 64 | 32 |
| V | = | 0 1 1 1 1 | 17 | 0F | 71 | 65 | - |
| W | 2 | 1 1 0 0 1 | 31 | 19 | L1 | 66 | 25 |
| X | / | 1 0 1 1 1 | 27 | 17 | B1 | 67 | 22 |
| Y | 6 | 1 0 1 0 1 | 25 | 15 | A1 | 70 | 31 |
| Z | + | 1 0 0 0 1 | 21 | 11 | 81 | 71 | 02 |
| CARRIAGE RETURN | | 0 0 0 1 0 | 02 | 02 | 10 | 17 | - |
| LINE FEED | | 0 1 0 0 0 | 10 | 08 | 40 | 21 | - |
| LETTER SHIFT | | 1 1 1 1 1 | 37 | 1F | F1 | - | - |
| FIGURE SHIFT | | 1 1 0 1 1 | 33 | 1B | D4 | - | - |
| SPACE | | 0 0 1 0 0 | 04 | 04 | 20 | 01 | - |
| (NOT USED) | | 0 0 0 0 0 | 00 | 00 | 00 | 00 | - |

FIG. 4.

INVENTORS.
WILLIAM F. GUNNING
JOHN F. WILSON
CHARLES C. BERTRAM
By White & Haefliger
ATTORNEYS.

INVENTORS.
WILLIAM F. GUNNING
JOHN F. WILSON
CHARLES C. BERTRAM
BY White & Haefliger
ATTORNEYS.

INVENTORS.
WILLIAM F. GUNNING
JOHN F. WILSON
CHARLES C. BERTRAM
BY White & Haefliger
ATTORNEYS.

INVENTORS.
WILLIAM F. GUNNING
JOHN F. WILSON
CHARLES C. BERTRAM
By White & Haefliger
ATTORNEYS.

INVENTORS.
WILLIAM F. GUNNING
JOHN F. WILSON
CHARLES C. BERTRAM
BY White & Haefliger
ATTORNEYS.

INVENTORS.
WILLIAM F. GUNNING
JOHN F. WILSON
CHARLES C. BERTRAM
By White & Haefliger
ATTORNEYS.

COMMUNICATIONS EXCHANGE

BACKGROUND OF THE INVENTION

This invention relates generally to communications, and more particularly concerns apparatus for automatically interconnecting Telex subscriber lines and trunks.

In the past the interconnection of U.S. and foreign Telex subscriber lines and trunks has presented certain problems which are reflected in the existence of various needs. Among these have been the need for highly reliable automatic equipment capable of the functions described herein, and the need for special redundancy features in such automatic equipment.

SUMMARY OF THE INVENTION

It is a major object of the invention to provide an electronic Telex exchange capable of meeting the above needs as well as others which will become clear from the following description. This new exchange provides compatible connection between the equipment (as for example teletype) of the calling and called parties; complete and accurate accounting; call processing with allowance for intervention by a human operator when required; maintenance analysis and recognition of malfunctions and actuation of alarms; and cyclic analysis of subscriber generated signals. Disc storage is provided for storage of call processing data such as class of service data, for each terminator, switch routings, terminator addresses and temporary storage of accounting data during processing of a particular call. At the end of each call, the accounting data is permanently stored on tape.

Basically, the exchange comprises a subscriber terminator network and a trunk terminator network and switches operable to establish a large number of possible paths through the networks; multiple computers operable simultaneously upon network transmitted data to similarly process the data; and a system controller through which communication of data between the networks and the computers is established and operable to determine which of the computers should be preferred as communicating valid data and which of such preferred computers shall be used as a sole survivor to transmit valid data to the switch network. In this regard, calling Telex or TWX signals arriving at the terminators are sensed (as are the activity states of all terminators) by the computers with redundant operation via the system controller, and the computers effect locations of idle trunk or line routes to the called teletype, on-line operation of the called teletype and operation of switches in a network or matrix to establish connection of the calling equipment to the selected trunk or line, auxiliary functions such as recording and accounting being performed as will be described.

Typically, the computers include a scanner distributor operable on a time-dependant basis and in response to central processor controlled programming to communicate signal processing data concerning trunk activity status between the terminators and the computers for storage in core. Also, each computer includes input/output processor means operable to transfer data between core and peripheral data storage equipment (such as disc and tape files) via the system controller, and control the switches to connect the terminator of a calling equipment with the terminator of a called equipment.

In addition, the system controller may advantageously include like A and B channels each incorporating voting logic circuitry operable to select the preferred and sole survivor computers, the controller communicating outputs of the sole survivor computer via A and B channels for ultimate parity selection of one of the latter. For example, the output of the survivor computer scanner distributor is communicated to the terminators via A and B channels; the output of the survivor computer input/output processor is communicated to the switching network; and the output of the sole survivor computer input/output processor is communicated via A and B channels to peripheral storage and accounting equipment.

These and other objects and advantages of the invention, as well as the details of an illustrative embodiment, will be more fully understood from the following description and drawings, in which:

DRAWING DESCRIPTION

FIG. 1 (including FIGS. 1*a*, 1*b* and 1*c*) is a block diagram of the overall system;

FIG. 4 is a character/code tabulation;

GENERAL DESCRIPTION

Figure 1A:
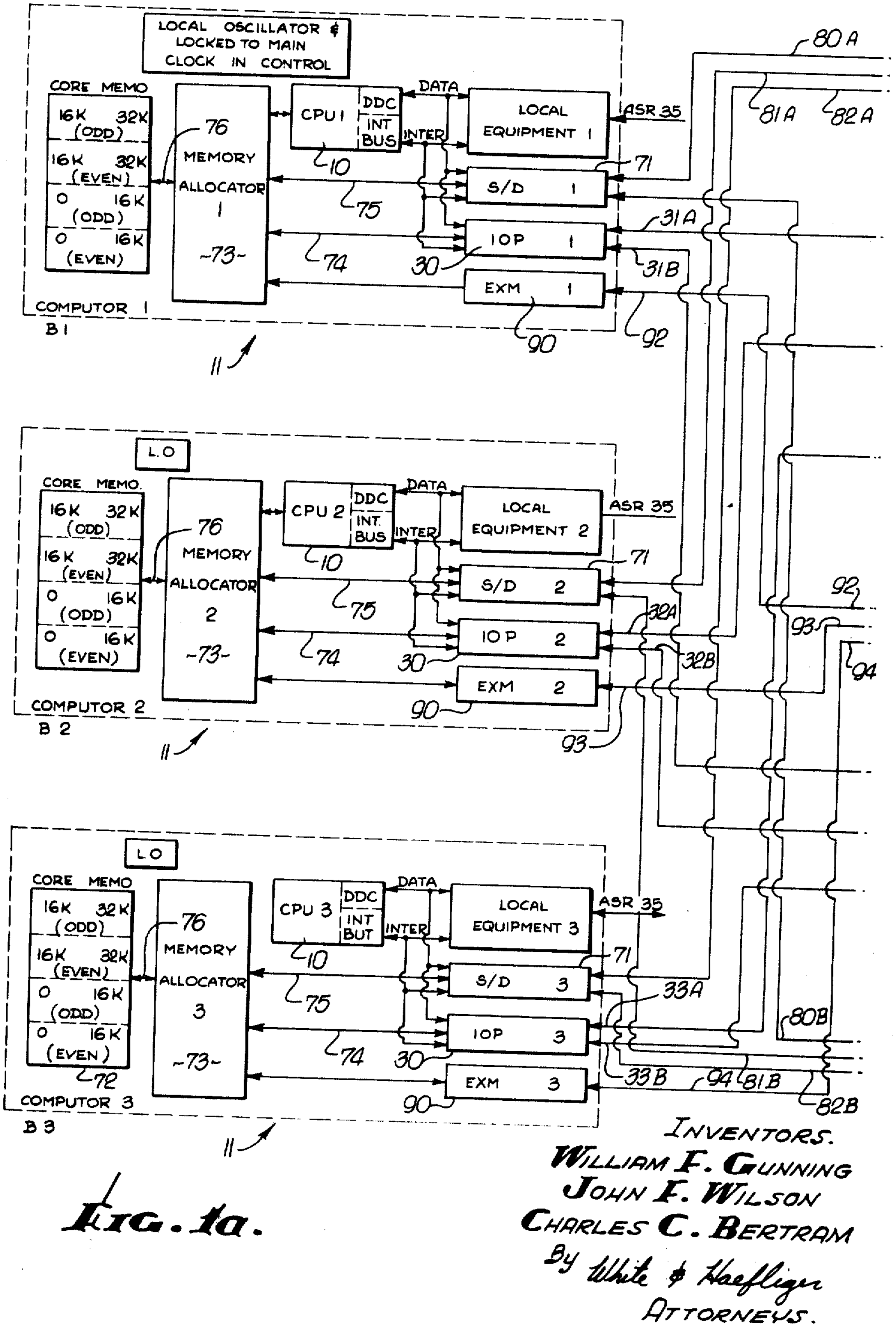

Referring first to FIG. 1, the computer Telex exchange generally includes three tridundantly operating central processing units (CPU's) 10 within computers 11; a block 12 that includes interfacing subscriber or line terminator bays 13, interfacing (Telex and TWX) trunk terminator bays 14 and associated switching networks 15 operable to establish multiple paths through the subscriber and trunk terminator network; and a system controller 16 through which communication of data between block 12 and each of the computers is established. The terminators include receivers for incoming signals from subscriber teletypes, etc. and transmitters for outgoing signals; also selection of the terminator for signal transmission is under CPU control via controller 16. Further, switching networks 15 in block 12 are under CPU control to connect the terminator of a calling party with the terminator of a called party.

The controller 16 is operable to determine which computers 11 shall be preferred as communicating valid or most reliable data, and which of the preferred (say, two) computers shall be used as the master (i.e. sole survivor) to transmit data to the block 12. More specifically, the controller 16 includes duplicate groups 17A and 17B of voting logic 17 connected in parallel channels A and B between each computer 11 and the block 12. Each logic group is operable to compare the three outputs of the simultaneously (tridundantly) operating CPU's 10 and to produce an output which duplicates the majority output of the three CPU's, to detect discrepancies among the three outputs and to evaluate same for determining which is least reliable and to detect discrepancies between the remaining two outputs and evaluate same for determining which of them is most reliable, the computer producing that output being then used as the sole survivor. That output then appears at 18A and 18B on redundant channels A and B.

In this regard, block 12 may be considered as within the broad category of "peripheral equipment", as may disc controller No. 1 (at 20) with associated disc No. 1 (at 21); back-up disc controller No. 2 (at 22) with associated disc No. 2 (at 23); console controllers 24 and 25 with associated supervisor and operator consoles 26; tape controllers 27 with associated tape units 28; and card punch, printer and reader and controllers 29*a*, 29*b* and 29*c*. Note that these item of peripheral equipment are connected with the voting logic 17A as via channels 0A, 1A, 6A and 7A, and with logic 17B via parallel channels 0B, 1B, 6B and 7B. Also, voting logic 17A is connected with the input/output (IOP) blocks 30 of the computers 11 via lines 31A–33A; and logic 17B is connected with those IOP's via lines 31B–33B.

It is the function of each controller 20, 22, 27 and 29 to receive the information on the A and B channels, to decide which of the channels shall be preferred as to use of the information thereon, and to transmit the preferred information to the corresponding peripheral elements such as disc files 21 and 23, console 26, tape units 28 and the punch, reader and printer elements associated with controllers 29. The same function is performed by controller elements in block 12, and associated with the trunk access terminals 36 and 37, the trunk junctor access terminals 38 and 39, the line concentrator terminals 40 and 41, and the line junctor access terminals 42, channels 1A and 1B being connected to each of the terminals 36–42. Such functioning may be carried out in accordance with known parity check principles. As to the latter, if the data on one channel has odd parity and corresponding data on the other channel has even parity, the control circuitry typically selects the odd parity data on the theory that, in a system designed to use odd parity, the most nearly correct information has odd parity and if a mistake in the data exists the parity would become even by addition or subtraction of one bit.

TERMINATORS AND SWITCHING

As regards switching network 12, its functions broadly encompass signal regeneration, and signal path selection (i.e., to connect any trunk to any other trunk, or any subscriber line to any other subscriber line, or any line to any trunk, or any line to one of several human operated assistance stations, or any trunk to one of several such stations).

Figure 1B:
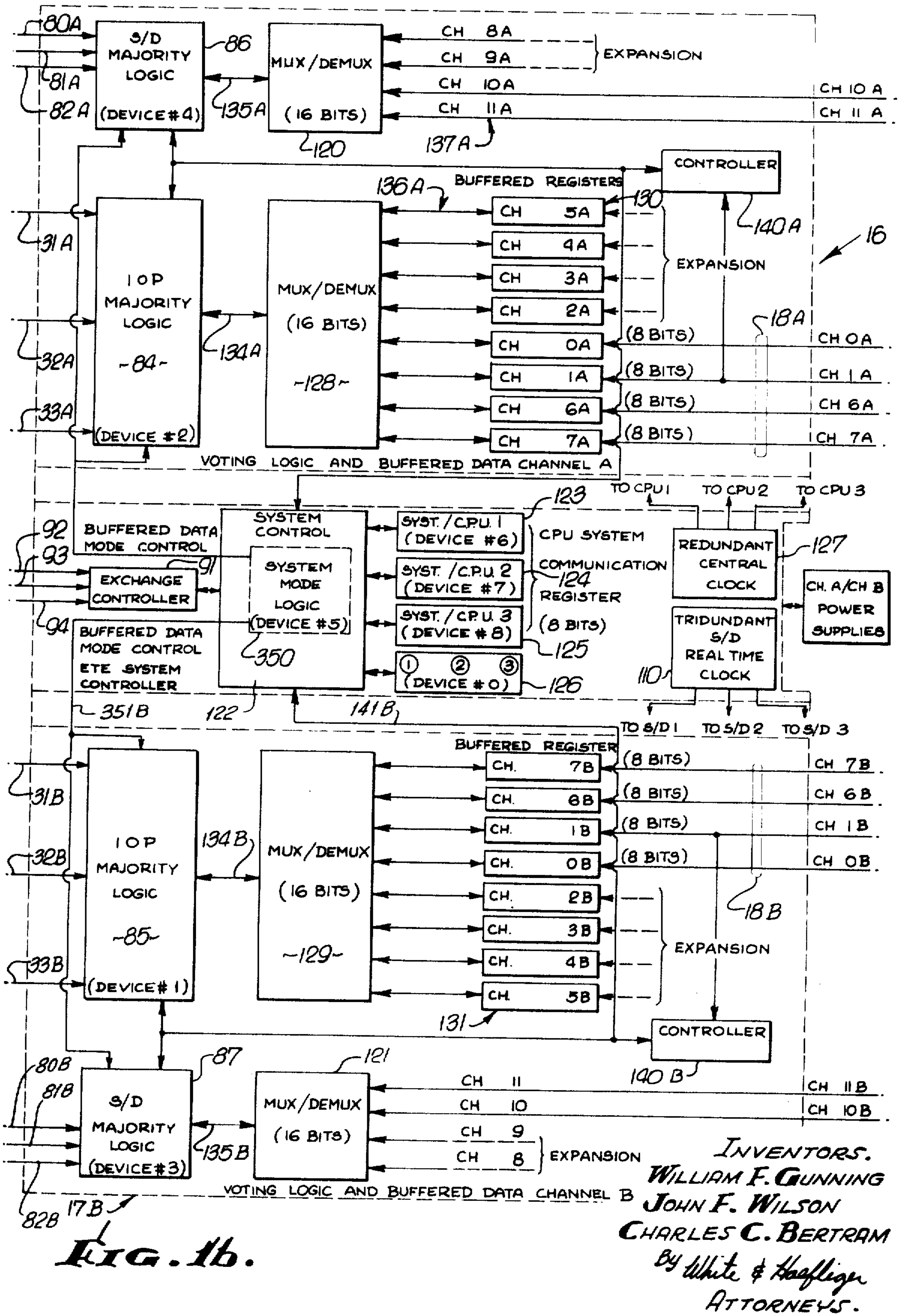
Figure 1C:
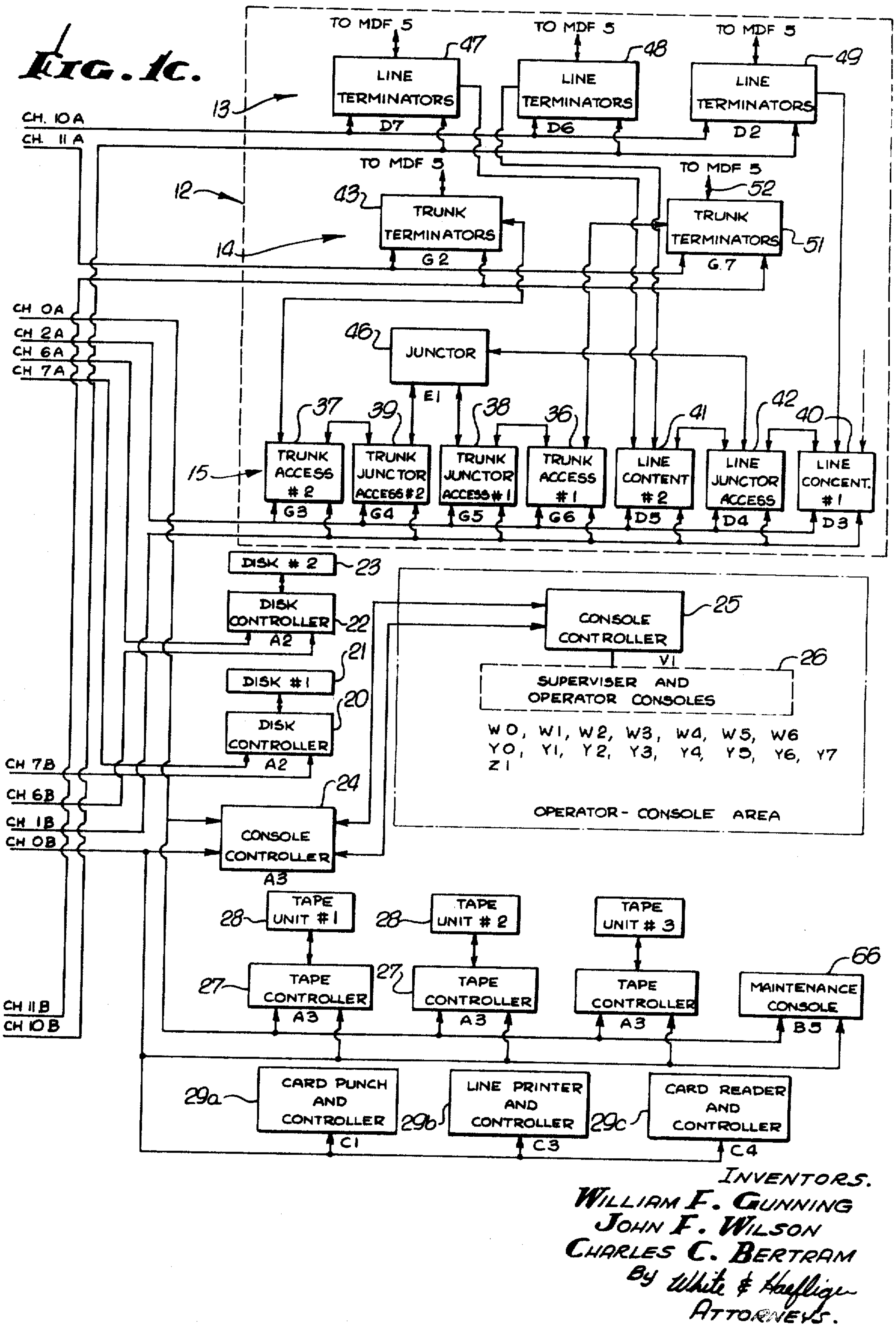
Figure 2:
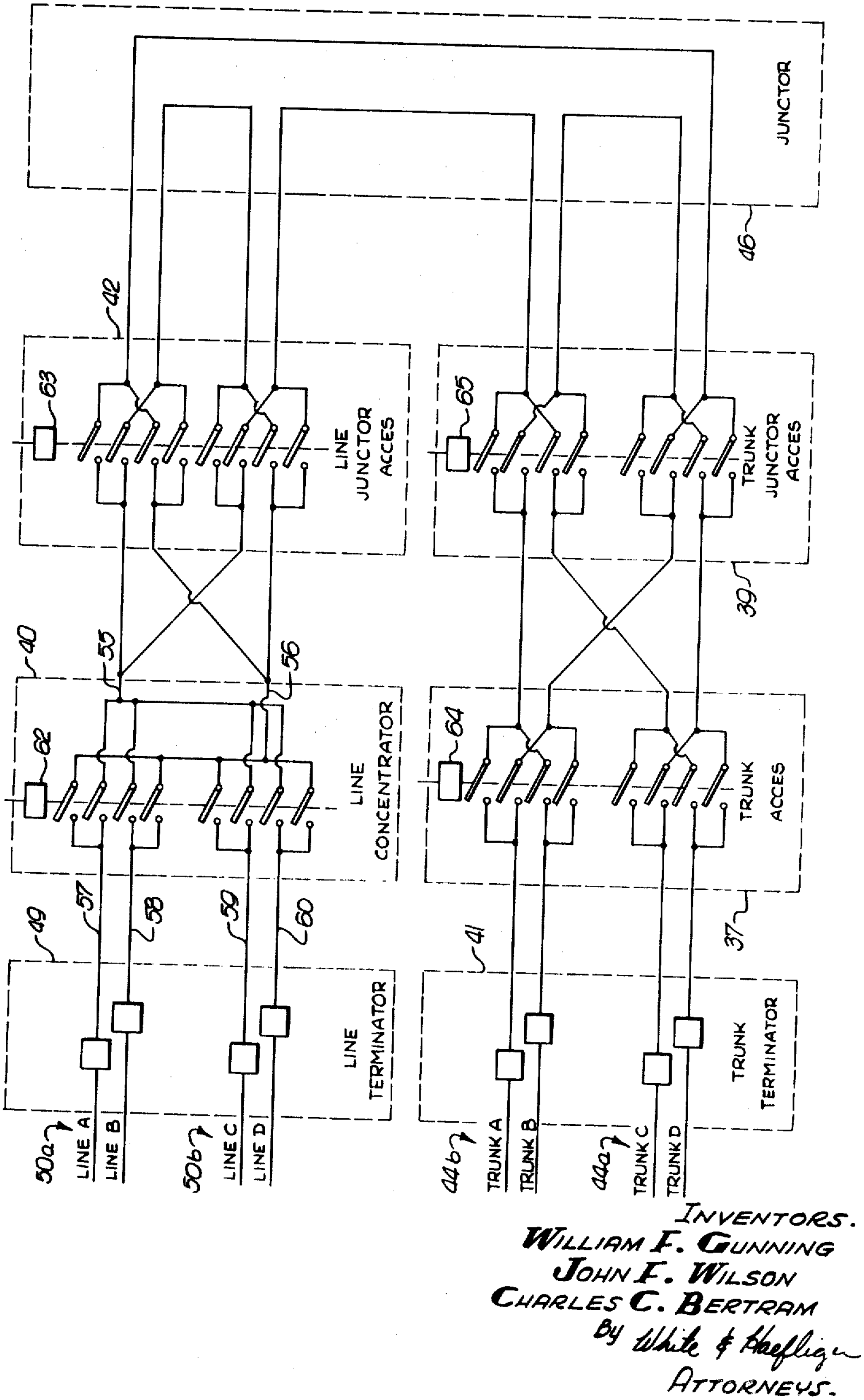
FIG. 2 is a switching diagram.

Routing of a Telex signal from the incoming line or trunk will be more fully understood from examination of FIGS. 1 and 2. Incoming signals on trunk lines 44 from a main distribution frame (MDF) arrive at a trunk terminator 43 and are regenerated and passed through the switch networks labeled "trunk access" 37 and "trunk junctor access" 39 to the junctor cabinet 46. From the latter, signals may be passed to one or more line terminators 47–49 via the switch networks labeled "line junctor access" 42 and "line concentrator" 40 and 41, the signals then being regenerated and passed to outgoing subscriber lines such as **50*b* associated with another main distribution frame (MDF). Alternatively, the signals may be passed to trunk terminator 51 via the switch networks labeled "trunk junctor access" 38, and "trunk access" 36, the signals then passing to trunk 52. The function of the switching network 12 (FIGS. 1*c* and 2) is to make the incoming signal available, by switching to the remaining lines and trunks, it being understood, of course that switching is under the control of signals from the computers via controller 16, and applied through Channels 1A and 1B. Terminator selection (as for example idle line or idle trunk) is also under the control of the computers via controller 16, the control signals being applied through channels 10A and 10B (to the line terminators) and channels 11A and 11B (to the trunk terminators. Switch controls are schematically indicated at 62–65**.

In FIG. 2, the number of lines between the line concentrator 40 and the line junctor access unit 42 (as for example lines 55 and 56) is half the number of lines between the concentrator 40 and the terminators 49 (as for example lines 57–60; therefore, only half of the subscriber lines may be used at any one time. The trunks in FIG. 2 are not concentrated, so that all trunks could be used simultaneously if none of the trunks were to be connected to a destination already in use. Further, any trunk may be connected to any other trunk, or to any line, and any line may be connected to any other line or any trunk. Each terminator includes incoming and outgoing pairs of wires (see pairs **44*a* and 44*b*, and pairs 50*a* and 50*b* in FIG. 2**).

The junctor cabinet 46 is passive and contains a network of patch cords which are selected by the switch networks. There are four wires (two outgoing and two incoming) in each line or trunk. The connections in the junctor cabinet are such that the incoming wires from one selected terminator are automatically connected to the outgoing wires of the other selected terminator. Terminators 47–49 and 43 and 51 and switch cabinets 36–39 and 40–42 may each contain redundant controllers. If a malfunction is detected on one such controller in one cabinet, the computer Telex exchange (CTE) operating program will put the data channel associated with that controller off line and will print a message to that effect on the maintenance console 66 in FIG. 1. If both controllers in that cabinet show a malfunction, the CTE operating program will activate the entire cabinet and will attempt to drop all associated calls. The controllers check the validity of the incoming data on associated A and B channels and, if an error is detected, determine with channel to use (parity check). The controllers also notify the computers when an error is detected.

COMPUTERS

In general, each computer 11 includes one general-purpose central processing unit (CPU) 10 as previously referred to, and two special purpose computers, i.e., an Input/Output processer (IOP) 30 and a Scanner/Distributor (S/D) 71. Each of these processers 30 and 71 share core memory 72 on a first-come, first-served basis via a memory allocator 73, connections being shown at 74, 75 and 76. The CPU 10 is the center of call processing, while the IOP 30 is used to transfer information from or to the core from the peripherals (switching network 12, disc, tape and card punch, printer and reader elements). The IOP accomplishes buffered or non-buffered information transfer on an interrupt basis. The S/D 71 is used to transfer data from the incoming Telex lines and trunks via the terminators 47–49, 43 and 51 to core memory, and operates using a polling technique that is instituted at regular intervals, as for example every millisecond. The incoming lines are scanned often enough to insure that any data being received or transmitted at 50 baud or less will not be missed. Performance of control and sense "activities" for each terminator is accomplished by means of orders from the S/D, and such activities include control of mark-space start and polarity of a line or trunk to allow the exchange to key the line or trunk, and sensing of the idle, stop, mark or space state of the regenerated line or trunk. Terminator selection in a bay is also under the control of the S/D.

Figure 3:
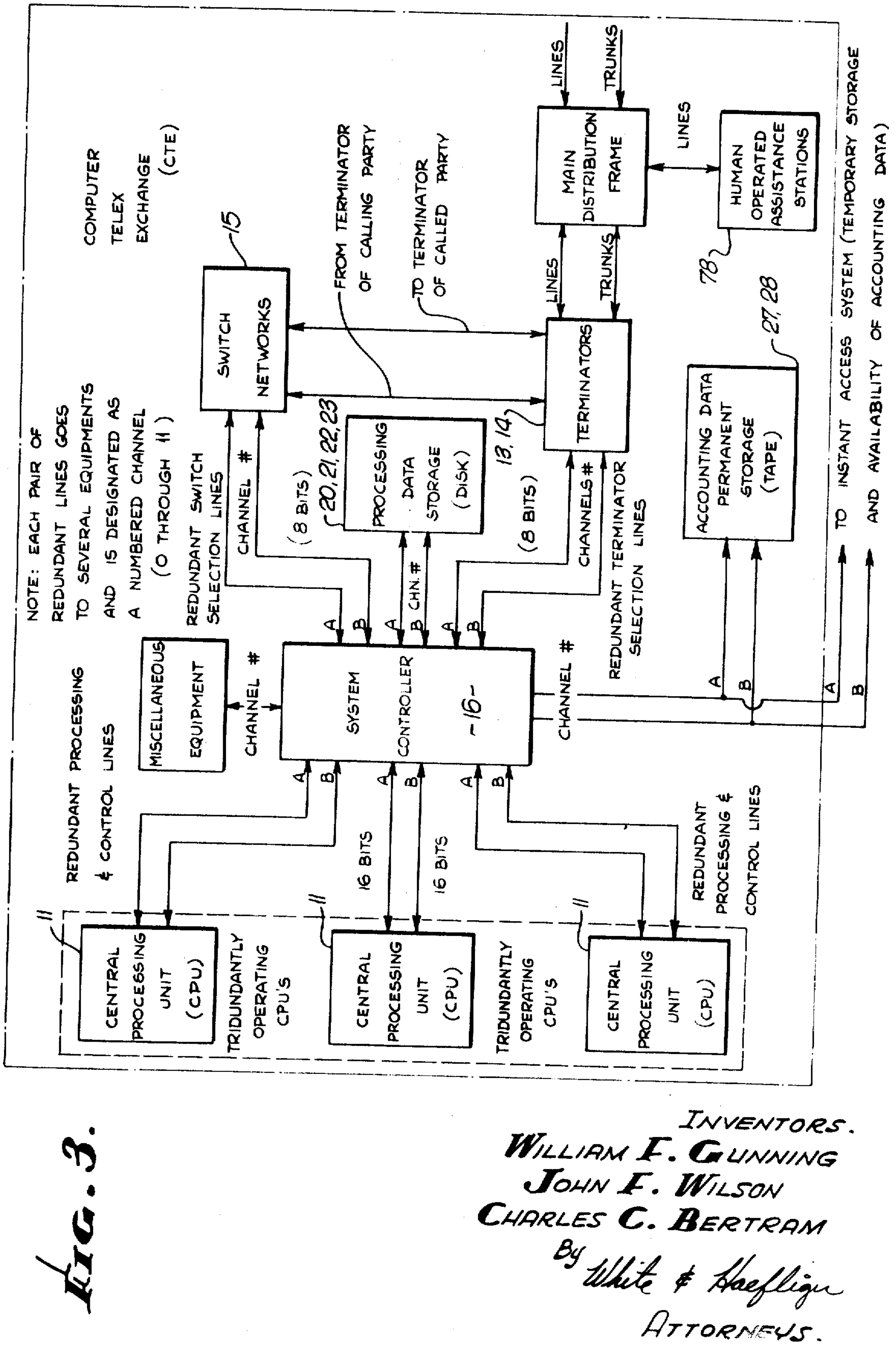
FIG. 3 is a simplified block diagram of the overall system.

It should be pointed out that the overall Computer Telex Exchange (CTE) seen in FIG. 1, is under computer control to perform all functions of a teletype exchange, which include provision of a compatible connection between equipment of the calling and called parties; providing all call processing normally required of a teletype exchange, including the services of a human operator when required; providing complete and accurate accounting records of all CTE processed calls; and providing cyclic maintenance analysis of all CTE processes, with recognition of malfunctions and actuation of alarms to indicate such malfunctions. Human operated assistance stations are indicated at 78 in FIG. 3 as operatively connected with the subscriber lines proximate the main distribution frame (MDF). FIG. 3 illustrates, in simplified form, the relationship of the computers 11 to the Computer Telex Exchange system.

All call processing the control data from the System Controller 16 is transmitted in identical form over redundant A and B lines, as shown. Each equipment receiving the two inputs contains logic to evaluate the inputs and to select the most reliable one of the two inputs. Any discrepancy between the two redundant signals or any pair of lines will cause an alarm to be activated and a self test routine to be accomplished.

The system can operate in three primary on-line modes with respect to central processor unit multiplicity. These modes are:

1. Tri-dundant (Three CPU's)
2. Survivor with backup (Two CPU's)
3. Sole Survivor, no backup (One CPU)

Determination of degradation from tri-dundant to survivor with backup operation may be made by hardware vote logic or manual push button on the system controller 16. Determination of degradation from survivor with backup operation to sole survivor operation may be made by software on-line diagnostic or manual pushbutton. Final system degradation may be made by technician evaluation of messages output on the maintenance read-out unit 66 (FIG. 1) and the utilization of a maintenance technician command to deactivate call processing.

When all three CPU's are transmitting and receiving through the system controller in synchronization, the system is in the tri-dundant mode. One CPU or two CPU's can be placed in the down condition by the computers or by manual operation of the system controller control panel. When one CPU or two CPU's are down, only one CPU (termed the survivor) transmits and receives data through the system controller. If only one CPU is down, the CPU that is neither down nor survivor is termed the backup. The backup continues to receive data through the system controller and continues to transmit data in synchronism with the survivor. The backup CPU's outputs to the data channel are disabled by the system controller. The system controller compares the survivor and backup outputs and any discrepancy generates an interrupt. The backup is thus held in immediate readiness for switching to survivor status in the event of failure of the survivor.

A down CPU also receives data and transmits data as far as its disabled inputs to the system controller; however, two down CPU's outputs are not compared with the survivor and backup outputs. A CPU is normally placed in the down condition preparatory to placing the CPU off-line. Off-line is a maintenance condition in which the down CPU no longer operates in synchronization with the other CPU's. An off-line CPU does not send or receive call processing data although it can communicate with off-line peripheral devices over an off-line lettered channel.

Before an off-line CPU is returned to regular call processing, it must be updated with data currently in the survivor CPU's core memory. A computer may be brought on-line by initiating an exchange fill sequence from the system controller control panel. The exchange fill sequence transfers the current data from the core memory of the survivor to the core memory of the off line CPU. The minimum operating configuration of the CTE which could provide normal non-degraded call processing consists of one computer, one data channel, one disc, one tape, and all terminators and switches.

The computer Telex Exchange system may use standard telex character codes as listed in FIG. 4.

Referring again to FIG. 1, each IOP and each S/D in each computer 11 has two 18-bit (16 data bits and 2 parity bits) bi-directional communication channels to the system controller. Thus, the IOP channels are designated 31A, 31B; 32A, 32B; and 33A, 33B. The S/D channels are designated 80A, 80B; 81A, 81B; and 82A, 82B. The A and B channel of each pair transmit identical data if the apparatus is operating properly, so that the controller receives six identical inputs representing the IOP output from the computers and six identical outputs representing the S/D output from the computers. Separate majority logic 84 and 85 in the controller for the A and B channels respectively from the IOP's reduces their six outputs to redundant pairs of channels between the controller and the peripheral devices as previously referred to; likewise, separate majority logic 86 and 87 in the controller for the A and B channels from the S/Ds reduces their six outputs to redundant pairs of channels (i.e. ch10A, ch10B; ch11A, ch11B) between the controller and the terminator bays 13 and 14, as previously referred to.

Each computer also includes an exchange module 90 connected with the exchange controller 91 in system controller 16 via channels 92–94, which are not redundant. The modules 90 and exchange controller 91 are used in conjunction with the Exchange Read Instruction in the CPU to transfer data from the memory of an on-line CPU to the memory of an off-line CPU prior to upgrading the off-line CPU to an on-line condition, in sync. This operation is accomplished during normal call processing with no degradation of service.

Figure 5:
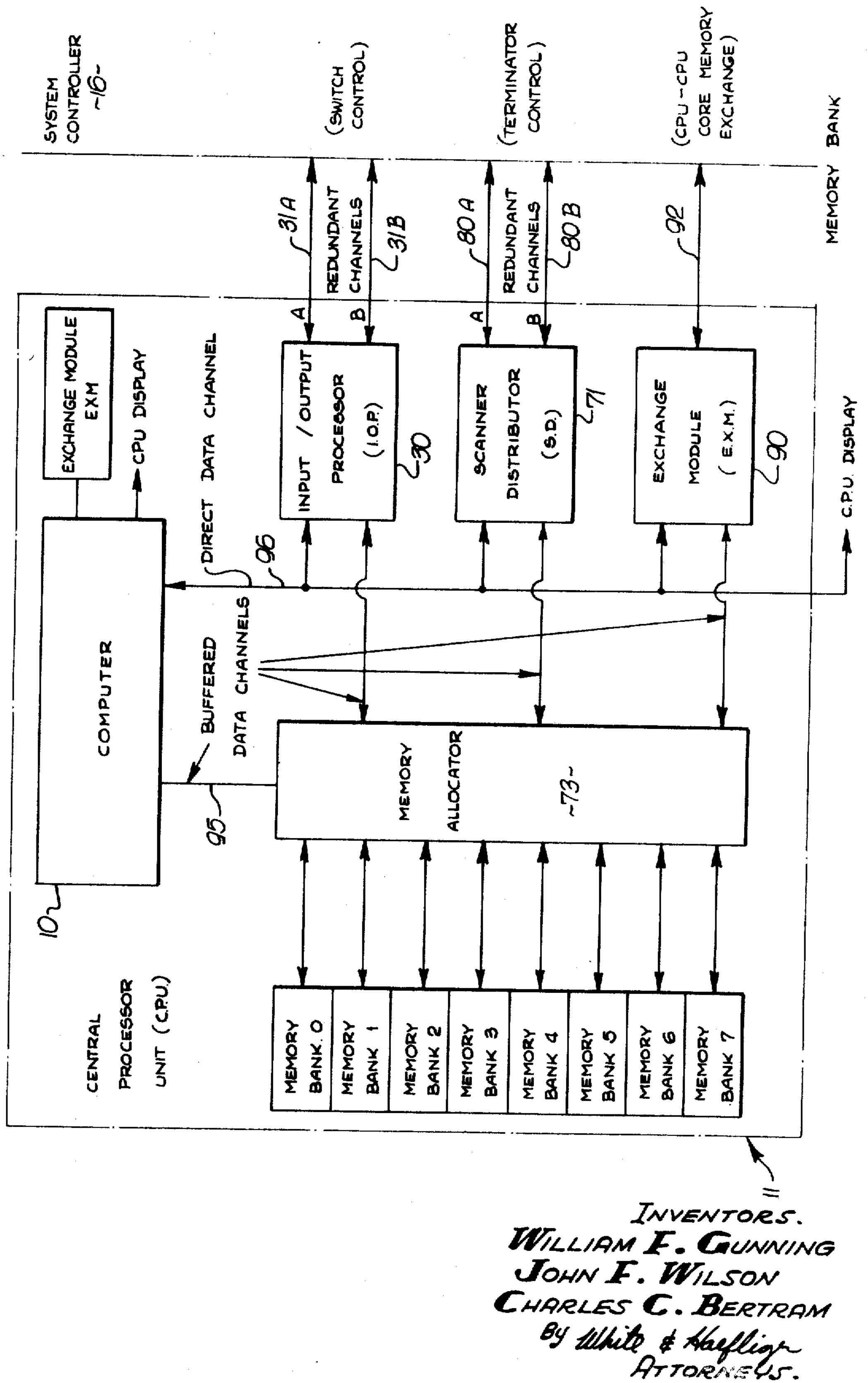
FIG. 5 is a computer block diagram.

FIG. 5 illustrates the functional relationship of the major components of the Central Processor Unit (CPU). Call processing is normally accomplished through the buffered data channel (BDC) 95. That is, the Input/Output Processor (IOP) and Scanner Distributor (S/D) communicate with the memory, and the CPU computer 10 accesses the memory via channel 95 to obtain data from the IOP and the S/D. The direct data channel (DDC) 96 is used for special requirements, such as, maintenance routines and interrupt routines. In these instances, the IOP or S/D (as applicable) become transparent and permit the computer to communicate directly with Telex Exchange Equipment without altering the contents of the core memory.

The memory allocator 73 functions to decode and encode memory addresses and memory commands. It permits reading or writing any of the 64,000 16 bit addresses contained in eight memory core banks. The memory allocator also permits reading or writing either the upper half or the lower half at any memory address.

The exchange module 90 does not provide any significant function during call processing, maintenance routines, or interrupt routines. Rather, it is used to facilitate the transfer of data from the core memory at an on-line computer to the core memory of an off-line computer, through the exchange controller 91 in the system controller. The Exchange Module of the survivor (on-line) CPU also delays any write requests from the CPU, IOP, and S/D until the current EXCHANGE READ cycle is completed. After completion of a transfer (EXCHANGE READ) to the down (off-line) memory bank, any pending write requests in the survivor memory allocator are allowed to proceed.

Figure 6:
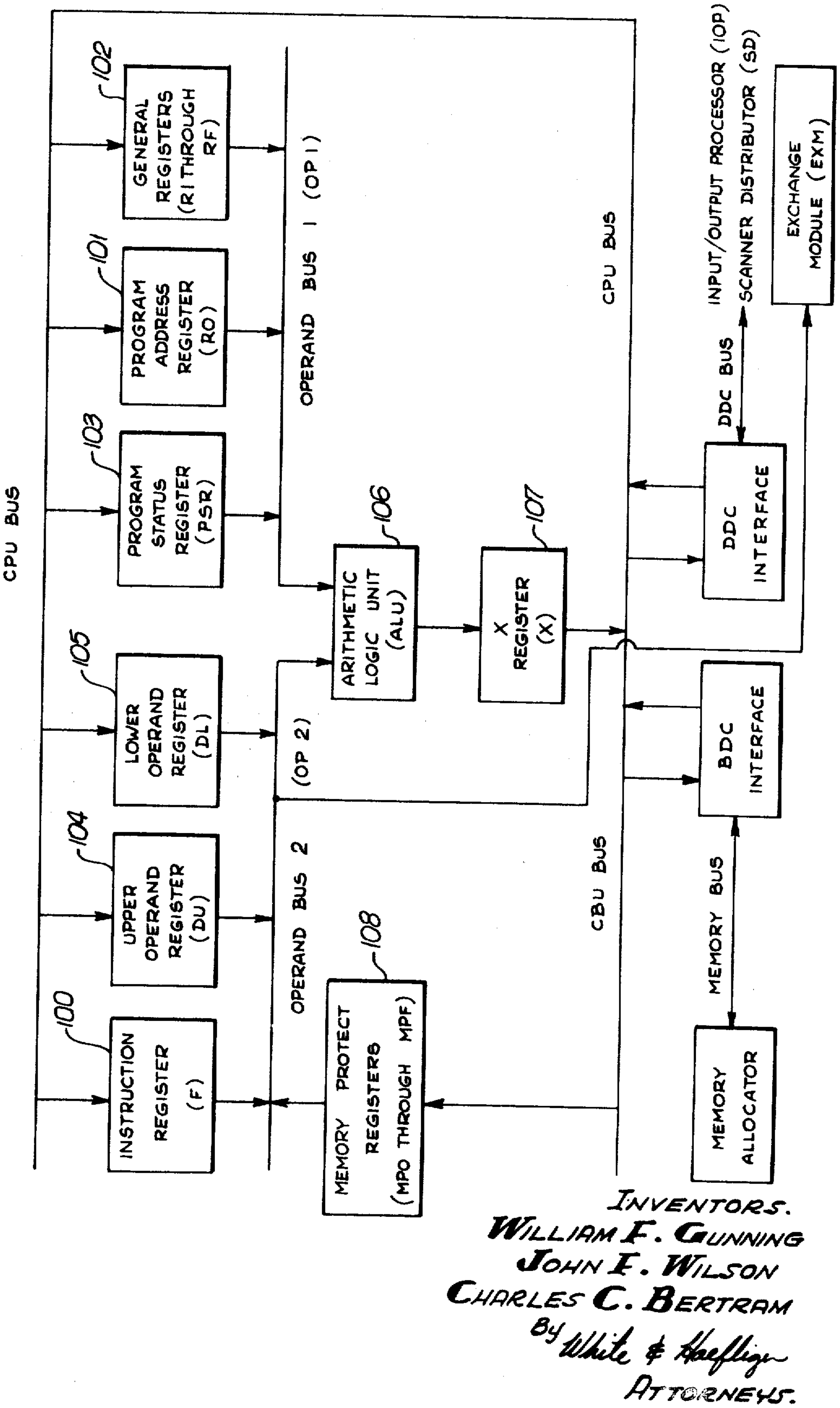
FIG. 6 is a block diagram of the components of the computer central processing unit.

FIG. 6 illustrates the major components of the CPU 10 and their functional relationships. Instruction register 100 stores the current instruction being executed by the computer; program address register 101 stores the memory address of the next instruction; and general registers 102 are usable as directed by the program. Program status register 103 stores the status of the current program and is used to determine the next Sequence or instruction. Its contents are stored in memory during program interrupts, so that the interrupted program may be resumed when permissible. Upper operand register 104 stores the operand selected by the instruction from memory or from one of the general registers 102; and lower operand register 105 is used during single word operations. Both upper and lower operant registers are used during double word operations. Arithmetic and logic unit 106 performs ADD, OR, AND, INCREMENT, EXCLUSIVE OR, MULTIPLY or DIVIDE operations on the selected operands. It also becomes "transparent" to permit data transfer without alteration. "X" register 107 provides temporary storage for the output of the unit 106 prior to routing the data to the memory or to one of the registers within the computer. Memory protect registers 108 may include 16 16-bit registers which designate portions of the memory temporarily shielded from alteration. Each of the 256 bits, when set, protects 256 memory locations.

Figure 7:
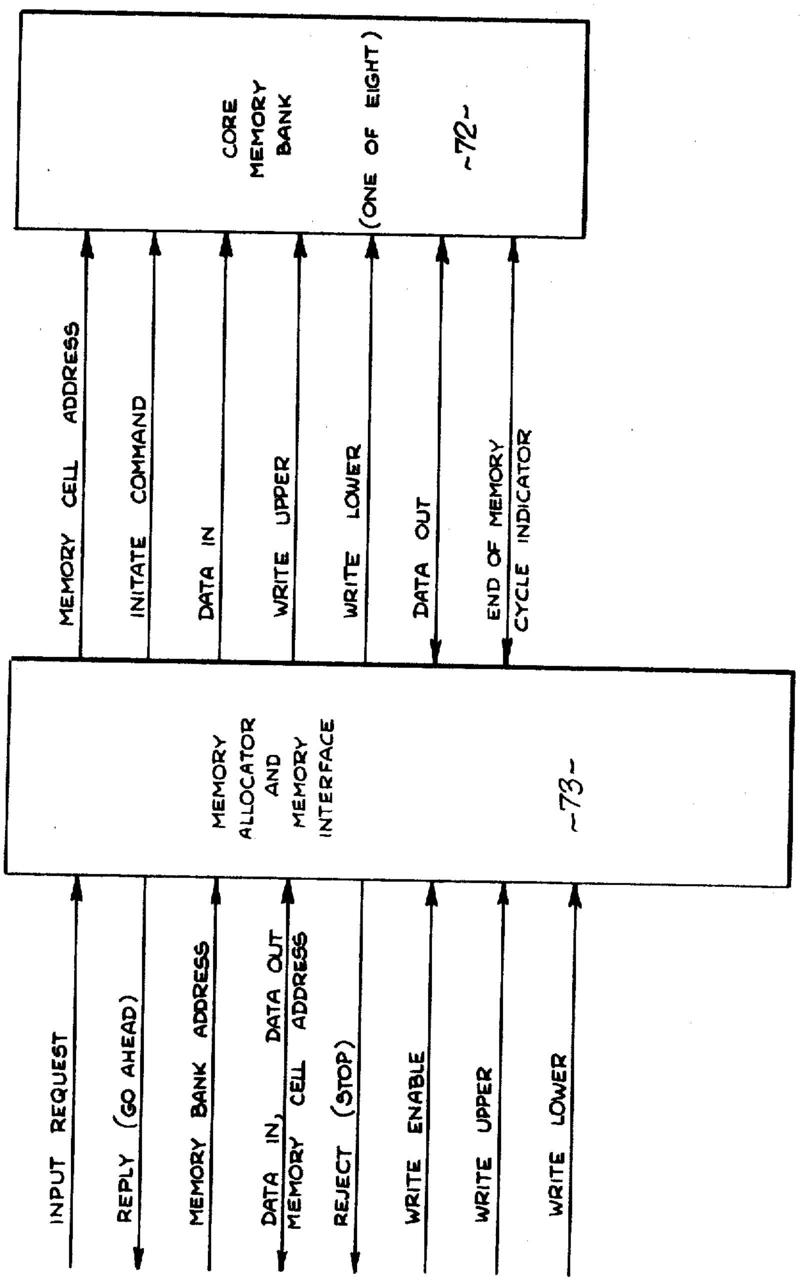
FIG. 7 is a block diagram of the computer memory allocator and interfacing.

FIG. 7 illustrates the input and output requirements for the memory allocator 73 and the core memory 72. Inputs and outputs are similar between the memory allocator and all four users (Computer, IOP, S/D and EXM), and the communications requirements between the memory allocator and each of the eight memory banks are identical. The memory allocator and memory interface logic serve two primary purposes: (1) to route the commands and data to the proper memory bank, and (2) to prevent the users (Computer, or IOP, or S/D, or EXM) from accessing the same memory location simultaneously with resulting destruction of data.

Figures 8, 9:
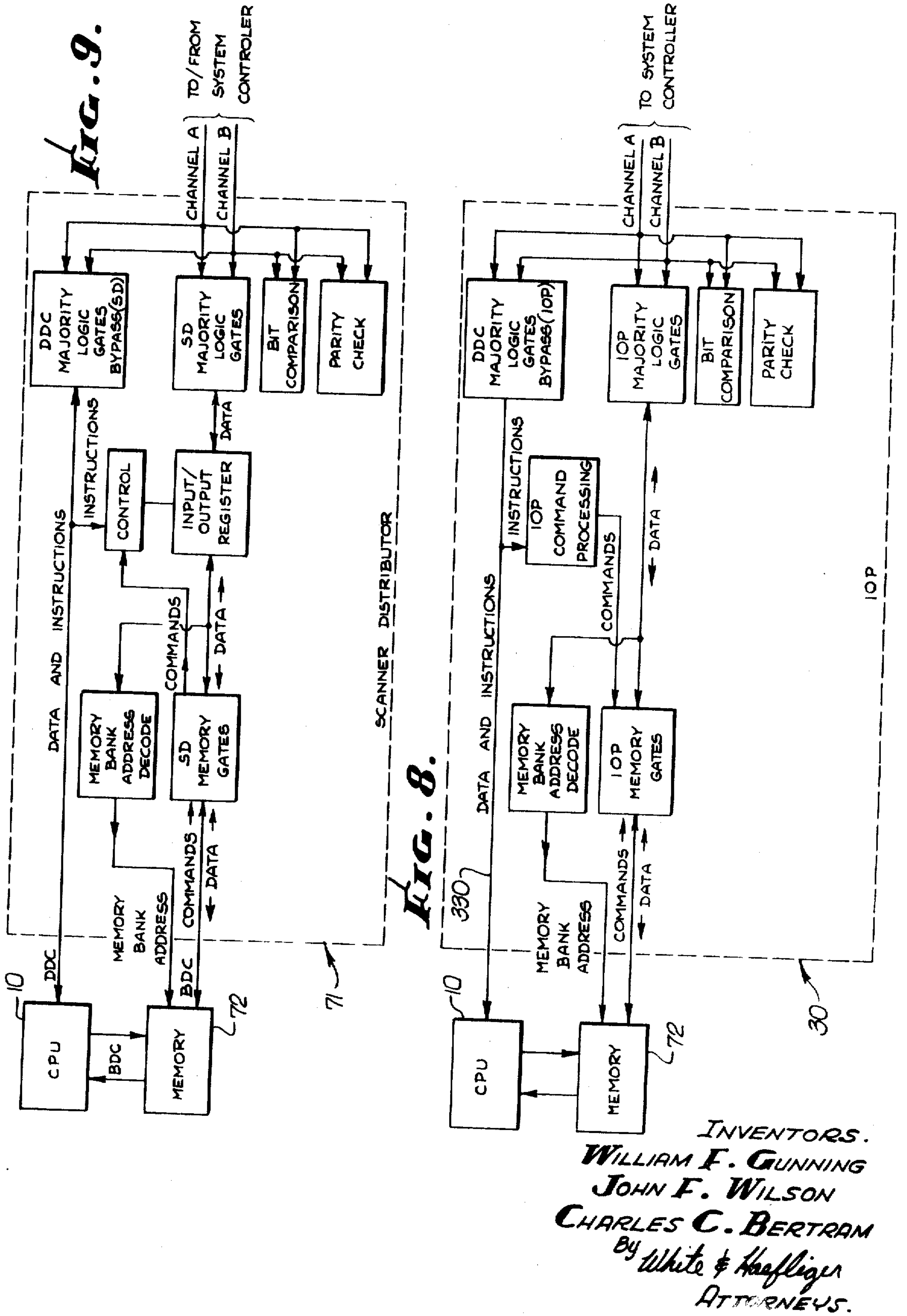
FIG. 8 is a block diagram of a typical computer input/output processor.
FIG. 9 is a block diagram of a typical computer scanner/distributor.

The Input/Output Processor (IOP) 30 seen in FIG. 8 transfers data from the core memory to any addressed CTE equipment (except terminators), and from any CTE equipment (except terminators), to the core memory in response to commands and programming by the CPU 10. For example the status of the switches at 15 is still in core via the IOP's. The CPU is capable of organizing programs for the IOP in central memory, and IOP start-up is CPU controlled.

During normal call processing, the data from the transmitting CTE equipment is received from the System Controller and is gated by the IOP to the core memory 72. The IOP 30 does not process the input data, except to check the parity and to regenerate a correct parity if the parity of the incoming data is incorrect. The IOP then selects data from memory, as programmed by the CPU Computer and addresses the data to the proper CTE device. Again the IOP does not modify the output data in any manner. However, output data is delayed in the IOP until the system controller is ready to receive it.

During special operations (interrupt routines, etc.) the data and instructions bypass the memory and are gated on path 330 directly from the CPU computer to the system controller and ultimately to the addressed device.

The IOP provides service to the CTE devices on a priority basis. All IOP serviced CTE processing devices are connected to one of eight numbered device channels, with the high numbered channel having the highest priority for service. If a program is interrupted by a request from a higher numbered channel, the IOP will store the status of the incomplete program and will service the higher numbered channel, and then will complete the interrupted program.

The IOP notifies the CPU computer when any device requests special service (requests on interrupt routine) and stores the requests so that the CPU computer may poll the status of the interrupt requests at any time.

Figure 10:
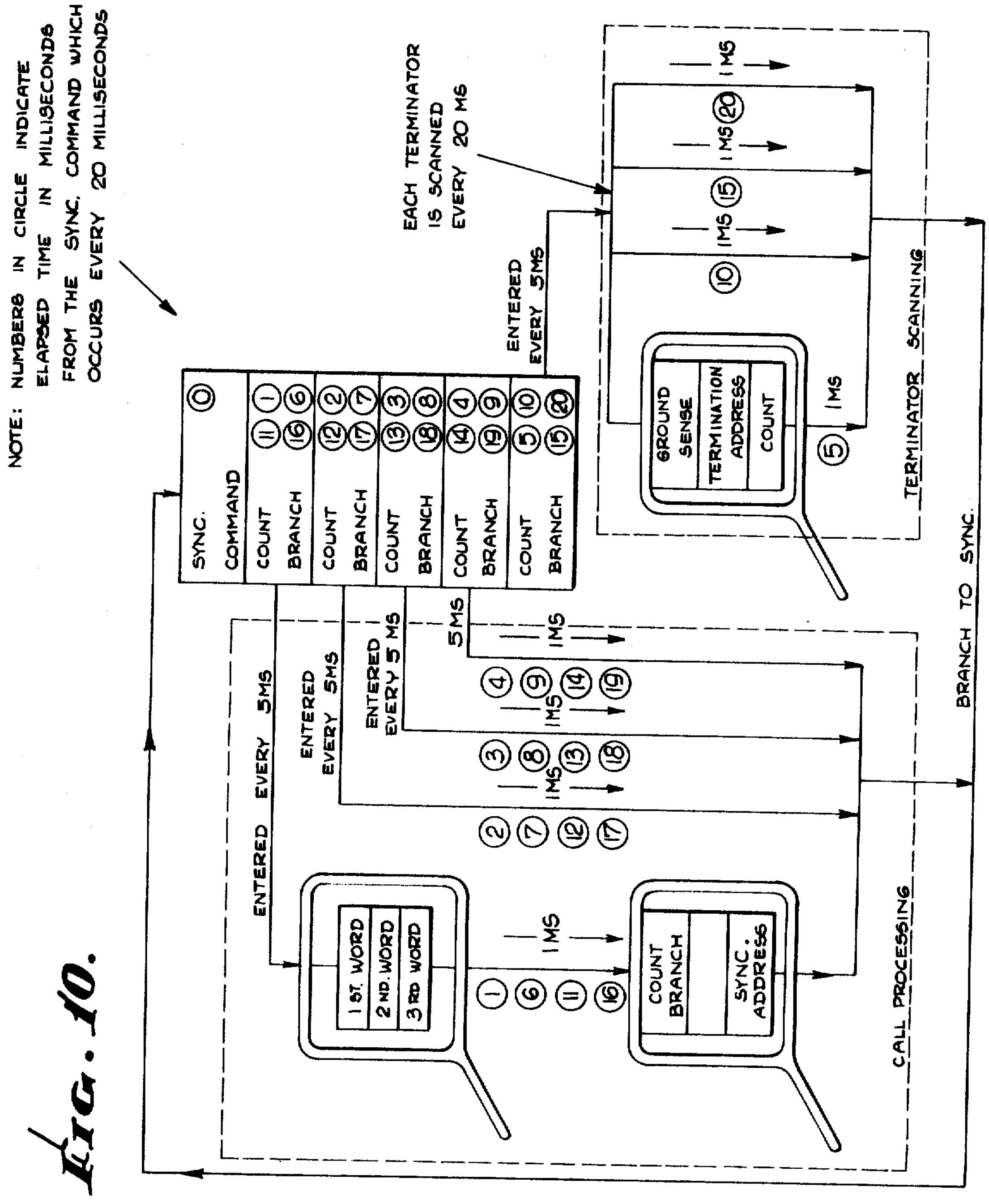
FIG. 10 is a diagram of a typical program sequence of the scanner distributor.

The Scanner Distributor as seen in FIGS. 1 and 9 functions to transfer data from the terminators 13 and 14 to the core memory 72 and from the core memory to the terminators, via the controller 16. It also scans the terminators sequentially and stores the status of each terminator in a reserved memory location. A new scanning sequence is initiated at 5 millisecond intervals. Four sequences are required to scan all trunk and line terminators; therefore, each terminator is scanned once in each 20 millisecond period, as illustrated in FIG. 10.

When an addressed terminator is in receipt of dialing information from subscriber equipment, it is transferred to a service register (a stored-program mechanism of the S/D) for baud character assembly and subsequent transfer to the CPU. When the CPU desires to forward signalling information on the called trunk or line, the CPU transfers a character of for example up to 8 baud to the service register, which then transfers the character, a baud at a time, to the terminator. Timing of baud transfer is under the control of the S/D program and character timing of character transfer is under the control of the CPU program. In this regard, the S/D service register is capable of synchronizing to the baud modulation of the regenerated Telex data at the terminator. Signal processing handled via the S/D includes call confirmation, proceed to select, call connect, disconnect and dial pulses.

The S/D is also capable of reading the line activity state of multiple terminators in parallel. The activity signal indicates whether or not the Telex line is in idle or busy state, an activity word being placed in storage for the CPU to process. The terminator scan rate may be, for example, once every 80 millisecond for trunks, and once every 160 milliseconds for subscriber lines. Reading of activity words from a group of terminators is under S/D program control. The S/D program is set up in central memory 72 by the CPU and the latter starts the S/D operation by transmitting appropriate start-up pulses. A fixed program for scanning the terminators is executed by the S/D in synchronism with a real time clock 110 as seen in FIG. 1*b*.

READ SERIAL DATA

A read serial data routine contains four variations, which are performed by the S/D when the decoded value of field *f* of the first command word is equal to 8, 9, A, or B. The function performed when each of these values is programmed is indicated below:

| Field f | Function |
|---|---|
| 8 | Read Serial Data and Queue |
| 9 | Read Serial Data and Queue Coupled |
| A | Read Serial Data and Couple Slave |
| B | Read Serial Data and Couple Master |

When field *f* is equal to 8, the S/D addresses a specific terminator and senses the state of the terminator at intervals controlled by the decoded value of field *d*, so that a complete tyeletype character may be assembled in field X of the first command word. The interval between sensing of the individual character elements for the incoming data is established by the Baud Interval Count (BIC), which is stored in the PSR register during a prececing count branch routine. When the decoded value of field *d* has been reduced to *O*, the address of the command in the CR register is stored in the memory queue area.

When field *f* is equal to 9, the S/D addresses a specific terminator and senses the mark-space condition of the terminator. As in the case where the decoded value of field F is equal to 8 for a read-and queue command, the information is used to assemble a compete character in field X of the first command word. In addition, each bit of information is sequentially sent as a function code to the terminator addressed by the following command, so that the two terminators are effectively coupled to exchange information. If the decoded value of field *f* is 8, 9, A, or B for the following command, the coupling is bidirectional, which causes the teletype bit received by the addressed terminator to be sent to the terminator addressed by the previous read-and-queue-coupled command. If the decoded value of field *f* is not 8, 9, A, or B for the following command, the coupling is unidirectional, which causes the bit sensed by the previous read-and-queue-coupled command to be sent to the addressed terminator. As in the case where field *f* is equal to 8 and no coupling is programmed, the address of the command is placed in the memory queue area when field *d* has been reduced to 0. When field *f* is equal to B, the S/D provides bit-by-bit directional or unidirectional coupling between two terminators in basically the same manner as when the decoded value of field *f* is equal to 9.

When field *f* is equal to A, the S/D terminates a series of coupled commands with an unqueued bidirectional link. In this case, the command may only follow a read-and-queue-coupled or couple-master command, so that coupling is accomplished between the terminator addressed by the preceding command, and the terminator addressed by the current command. In addition, since a memory queue operation has not been programmed, the address of the command in the Communication Register (CR) is not placed in the memory queue area.

The major difference in this routine and the read-and-queue-coupled routine is that no character assembly is performed in field X of the command word in the CR register, and the address of the command is not stored in the memory queue area when the count in field *d* has been reduced to 0. In this routine, field *b* represents the number of bits in the incoming teletype character; and field *a* contains a reinitializing count. Therefore, when field *d* has been reduced to 0, the reinitializing count from field *a* is transferred to field *b* to define the number of bits in the next character, which is stored in the PSR register during a preceding count branch routine When the decoded value of field *d* has been reduced to 0, the address of the command in the CR register is stored in the memory queue area.

SYSTEM CONTROLLER

As seen in FIG. 1*b*, the system controller 16 includes two channels (A and B) of S/D redundant majority logic 86 and 87 and of time division multiplexing logic 120 and 121; two channels (A and B) of IOP redundant majority logic 84 and 85 and of associated time division multiplexing logic 128 and 129, having associated buffered registers 130 and 131; an exchange controller 91; system mode logic 122 connected with the controller 91; three individual CPO/system communication registers 123, 124 and 125 connected with logic block 122; a CPU input data alarm register 126; a redundant system clock 127, and a tridundant real time clock 110.

The majority logic produces one output at 134A which represents the logical state of at least two of the three IOP inputs and another output at 135A which represents the logical state of at least two of the three S/D inputs. The resulting IOP output 134A is directed to one of eight (0 through 7) IOP channels seen at 136A and the resulting S/D output is directed to one of four (8 through 11) S/D channels seen at 137A by address decoding and multiplexing logic. This entire process is duplicated on the channel A and channel B inputs to produce 12 channel A outputs (0-11) and 12 channel B outputs (0-11); however, with respect to time, only one IOP channel and one S/D channel are available; that is, only one of the peripheral devices can communicate with the IOP, and only one of the peripheral devices can communicate with the S/D, at any given time.

The system controller mode logic block 122 comprises the mode control logic and the system control panel. The mode control logic 350 is connected at 351A and 351B to majority logic to enable the inputs to the majority logic, and thereby defines the CPU's and channels that are on-line or off-line. The mode control logic also defines the CPU's that are survivors, back-up, down, or to be filled by the exchange operation.

During an exchange operation, the exchange controller 91 routes the contents of the survivor CPU's core memory to a down (off-line) CPU's core memory as directed by the system controller mode logic. The exchange operation is typically manually initiated from the system controller control panel, via softwave. A one-word exchange of core is carried out by execution of an exchange read instruction. The CPU, S/D and IOP are "frozen" during the execution. While the system is in exchange mode, any new data entering the system from the peripherals will be written in the off-line computer by the exchange process. At the completion of exchanging all core, an interrupt is automatically set in the system controller which insures all involved computers starting off synchronously.

Regarding the three system/CPU communication registers 123, 124 and 125, each is an 8-bit register loaded and read by the CPU's. These registers provide a communications link between an individual off-line CPU and the on-line CPU's. The registers are accessed by WRITE DATA and READ DATA DDC command from the on-line system. The registers 123–125 are connected with channels 1A and 1B via controllers 140B and lines 141A and 141B.

The data alarm register 126 allows the on-line CPU's to store input data alarm conditions in the System Controller logic. The status of the three bits (one for each CPU) are monitored by three lights (CPU INPUTS ALARMS indicators) on the System Controller control panel. The CPU input data conditions which will result in an alarm are determined by the CTE software program. The data alarm register is addressed as device No. 0 on channel 1 via controllers 140.

Synchronous operation is achieved throughout the CTE through the use of redundant crystal controlled oscillators in system clock 127. One crystal oscillator is used as a master and another as a slave. These oscillators are phase locked and are logically OR'D so that the output will continue even if one oscillator fails. The master and slave oscillator are both crystal controlled to operate at a frequency of 3,584 MHZ. The oscillator outputs are applied to phase check logic which generates an output voltage if either oscillator starts to drift out of proper synchronization, or if either oscillator fails. This output voltage activates an alarm signal to indicate the detected malfunction.

The output of the system clock is counted down to produce a 1 millisecond timing pulse train, and a four phase logic sequencing output which divides each 279 nanosecond time period into four segments of 69.75 nanoseconds each. The output of the central clock is used to produce a four phase logic timing signal and to produce a 10-millisecond interrupt signal to increment six real time clock words, stored in memory, which indicate the data and time for accounting data. A "number of days per month" table stored in core contains entries for 48 months to facilitate end of month processing.

The blocks 140A and 140B are input/output interface controllers for interrupt communications between the System Controller and the CPU's. These controllers are connected to device channel No. 1 of redundant data channels A and B, and provide decoding of special instructions (including the device address) from the CPU's.

Referring again to the disc storage area of FIG. 1*c*, the Disc Memory Cabinets contain Two Memory Units and two Electronics Gates at 21 and 23, and two Disk Controllers 20 and 22. The purpose of the memory unit is to supply the CTE with memory space for 3,276,800 16-bit with a maximum access time of for example under one-seventeenth of a second. Two memory units are used to provide redundancy. Storage space in each memory unit is contained on four rotating disks. Both surfaces of each disk are used, which makes eight surfaces available. Each surface is divided into an inner zone and an outer zone with each zone having 50 tracks. Each track contains 256 usable sectors and each sector contains memory space for 16 data words of 16 bits each. A read/write head is provided for each track. Data is read or written serially as the disk rotates under the head.

All information, including class of service, directory, translation, and call register store data is identically recorded on both disc units, to provide back-up in case of failure of one unit.

The following specifies the CTE disk allocation:

| FACE | ADDRESS | CONTENTS |
|---|---|---|
| 0 | 0 | ARQ |
| 1 | 0 | Call Register |
| 2 | 0 | I/C Class of Service |
| 2 | 1,024 | O/G Line Class of Service |
| 2 | 2,274 | Multi Line Hunting Groups |
| 2 | 4,322 | Maintenance R.O. Messages |
| 2 | 4,578 | ABD Status Tables |
| 2 | 4,603 | MHG Status Tables |
| 2 | 4,607 | O/G Group List Tables |
| 2 | 11,807 | Programs (except overlays) |
| 2 | 15,903 | Overlay Programs |
| 3 | | ABD Tables |
| 4 | | Unassigned |
| 5 | | Unassigned |
| 6 | | Unassigned |
| 7 | | Unassigned |

The purpose of the tape controller 27 is to enable the Central Processing Units to utilize storage space in tape units No. 1, 2, and 3, for recording message accounting and traffic analysis information. Three tape controllers occupy one cabinet. Each of two independent controllers controls one of the three tape units. Two of the tape units are normally on-line, while the third is used as a stand-by. One of the two on-line tape units is used for recording accounting data until the end of tape is approached. When the CPU receives the end-of-tape warning, it transfers the recording responsibilities to the second on-line tape recorder and addresses all subsequent accounting data to the controller of the newly activated recorder. The tape is divided down the middle to form two channels, one of which is designated channel A while the other is designated channel B. When a character is written into one of these channels, it also simultaneously written into the other. When data is retrieved bpth channels are read, and each character is then compared to its counterpart from the other channel. The CPU's are informed of the detection of any error.

EXAMPLE OF CALL COMPLETION

A typical call sequence is outlined as follows:

1. A calling teletype operator pushes the start button;
2. A current loop between that teletype equipment and a line terminator at the exchange is broken and detected at the terminator.
3. The S/D detects the broken loop, and detection data is placed in core;
4. The CPU detects that data, and data is transmitted to the calling teletype via the S/D and terminator to effect turn-on of the teletype motor, the S/D then being instructed by the CPU to send a proceed signal to the calling teletype. (Note: both S/D's are sending and receiving signals, and a line terminator checks parity);
5. The CPU allocates a call register in core to a call selection digits (teletype call number): 6. The S/D collects all selection digits coming in to that terminator, and places them in the allocated core, and also scans activity status of all terminators;
7. CPU programming determines which trunk (Say, to a called foreign exchange) should be selected for the particular selection digits received, an idle trunk is selected and the CPU operates via the S/D to break a current loop in the idle trunk which then operates as "off-hook" to the foreign exchange;
8. The foreign exchange detects the "off-hook" condition and sends back a "call-connect" (marking level) and "-proceed-to-select" (30 ms space) signal;
9. The S/D detects the 30 ms pulse which indicates the foreign exchange is ready to receive the selection digits. The S/D then outpulses the selection digits to the foreign exchange;
10. The foreign exchange sends back 150 ms call call connect pulse, meaning that the called teletype party is connected (if he is busy, the foreign exchange sends back a 600 ms "space" signal);
11. The CPU finds an idle path through the switching network from the calling party's line terminal to the trunk in question. Switching data is transmitted via the IOP's to the switch matrix 15 to effect the path connection. Note that the status of the switches is stored in core via the IOP's;
12. The CPU directs an answer back command to the calling teletype, which is triggered to send a 20 word identifying answer back signal to called foreign teletype, whereupon both parties are identified;
13. Data such as the time of day, and serial numbers of the teletype machines is taken from core and placed on disc memory to be held; later, after hang-up, the disc-held data is transferred back into core, along with length of call data, after which all the data is transferred into the tape for accounting purposes.

We claim:

1. A tridundant telex communications exchange adapted for interconnection of a large number of subscriber lines and/or trunks each connected to a terminator in said exchange, and comprising:
   a. a switching network including said terminators and a plurality of electromechanical switches adapted to effectuate interconnection between selected terminators under computer control,
   b. three computers each including (1) a scanner distributor for communicating message processing data between said switching network and said computer, and (2) an input/output processor for communicating switch status and control signals between said switching network and said computer, and
   c. a system controller including redundant channels for forwarding message processing data and switch status and control signals between said switching network and said scanner distributors or input/output processors, and further including system mode control logic and, for each channel, majority logic cooperating to establish which computer or computers are communicating valid data, message processing data and control signals being forwarded only from such valid data communicating computer or computers.

2. In a communication system of the character described, the combination comprising:
   a. a switching network comprising a plurality of subscriber line terminators and a plurality of trunk terminators and switches operable to establish a large number of possible message transmission paths between said terminators,
   b. multiple computers operable simultaneously upon network transmitted message processing data to similarly process said data and to produce output data for controlling said switches to effectuate interconnection between selected terminators, each computer including a core memory and a central processing unit,
   c. a system controller through which communication of data between said switching network and said computers is established, and operable to determine which computers shall be preferred as communicating valid data and which of such preferred computers shall be used as sole survivor to transmit most reliable data to said switching network,
   d. a scanner distributor with each computer and operable on a time-dependent basis and in response to central processor controlled programming in core memory to communicate message processing data and terminator activity status between said terminators and said computers, for storage in the computer memories, and
   e. wherein said system controller includes certain like A and B channels each incorporating voting logic circuitry operable in conjunction with system mode control logic to select said preferred and sole survivor computers, said controller communicating the output data of the survivor computer scanner distributor to said switching network via both said A and B channels.

3. The system of claim 2 wherein there are three of said computers.

4. In a communication system of the character described, the combination comprising:
   a. a switching network comprising a plurality of subscriber line terminators and a plurality of trunk terminators and switches operable to establish a large number of possible message transmission paths between said terminators,
   b. multiple computers operable simultaneously upon network transmitted message processing data to similarly process said data and to produce output data for controlling said switches to effectuate interconnection between selected terminators, each computer including a core memory, a central processing unit,
   c. a system controller through which communication of data between said switching network and said computers is established, and operable to determine which computers shall be preferred as communicating valid data and which of such preferred computers shall be used as sole survivor to transmit most reliable data to said switching network, d. input/output processor means with each computer and operable to transfer switch status and switch controlling output data between data storage means in the computer and said switching network, via said system controller, and e. wherein said system controller includes certain like A and B channels each incorporating voting logic operable in conjunction with system mode control logic to select said preferred and sole survivor computers, said computer operatively communicating the output data of the sole survivor computer input/output processor to said switching network.

* * * * *